3,084,204
PROCESS FOR ALKYLATION IN THE PRESENCE OF A SILICA-ALUMINA-FLUORINE CATALYST
Lionel Domash, Wilkins Township, Allegheny County, Stephen L. Peake, Pittsburgh, and Raymond C. Odioso, Glenshaw, Pa., assignors to Gulf Research & Development Company, Pittsburgh, Pa., a corporation of Delaware
No Drawing. Filed May 9, 1960, Ser. No. 27,501
2 Claims. (Cl. 260—671)

This invention relates to an alkylation process and more particularly to the alkylation of aromatic hydrocarbons with olefins in the presence of a specific catalyst.

It is known in the prior art to alkylate aromatics such as benzene and toluene with olefins such as ethylene and propylene to produce compounds that are valuable as chemical intermediates or as components of high octane gasoline. For example, the meta- and para-isomers of cymene produced by alkylating toluene with propylene have very high blending octane numbers and are valuable as gasoline components. They are also valuable as intermediates in the production of dibasic aromatic acids.

Various catalysts have been proposed for alkylation of aromatics with olefins. These include acid catalysts such as hydrogen fluoride and sulfuric acid, which are employed in the liquid or gaseous state. However, these highly corrosive fluid catalysts have had certain drawbacks, including the difficulty of recovering uncontaminated hydrocarbon products, and recent developments have led to the use of solid cracking catalysts of the silica-alumina type for certain alkylation reactions. We have now made a valuable improvement in the alkylation of aromatics with olefins in the presence of a solid catalyst through the employment of a fluorine-promoted silica-alumina catalyst.

The process of the invention in general comprises contacting a mononuclear aromatic hydrocarbon with a low molecular weight olefin in the presence of a silica-alumina, cracking-type catalyst containing a small amount of fluorine. In a preferred modification of the process wherein its greatest advantages are obtained the catalyst contains about 25 percent alumina and 1 to 3 percent fluorine, the aromatic charge stock is toluene and the olefin is propylene. The reaction conditions include a temperature in the range of 450° to 550° F., a pressure in the range of 500 to 1500 pounds per square inch gauge (hereinafter abbreviated as p.s.i.g.), and an aromatics to olefin mol ratio of less than 3:1. This modification of the process is characterized by a high yield of monoalkylated product and particularly of the valuable meta- and para-cymene isomers.

As indicated, the catalyst for our process consists essentially of a silica-alumina composite which is promoted with a minor amount, e.g., 1 to 5 weight percent of fluorine. We have found that such silica-alumina composites respond unexpectedly to the addition of a minor amount of fluorine as demonstrated in marked improvement in alkylation results. The silica-alumina composite can be any of the known silica-aluminas such as are employed as cracking catalysts, but the preferred composition consists of 20 to 30 weight percent alumina and the rest silica. A particularly valuable catalyst of this description is the silica-alumina catalyst containing about 25 percent alumina marketed by American Cyanimid Company under the name of Triple A. The incorporation of a small amount of fluorine in this catalyst, e.g., 1 to 5 weight percent, markedly and unexpectedly increases its value as an alkylation catalyst. The silica-alumina cracking catalyst can be prepared by any of the known methods for preparing synthetic silica-alumina compositions, including coprecipitation and cogelation.

As indicated, the catalyst contains a minor amount, such as 1 to 5 weight percent, of fluorine, and preferably 1 to 3 weight percent of fluorine. The fluorine can be added by treating the silica-alumina composite with an aqueous solution of hydrofluoric acid or with gaseous hydrogen fluoride. The fluorine-promoted catalyst can also be prepared by using boron trifluoride and a silica-alumina base that contains enough water to react with the boron trifluoride to form hydrogen fluoride, the hydrogen fluoride then reacting with the silica-alumina to form fluorine on the silica-alumina catalyst.

The aromatic charge stock for our process can be any of the mononuclear aromatics that are susceptible to alkylation. Preferred stocks are benzene and toluene. The charge stock can be a single such aromatic hydrocarbon or a mixture of two or more of the same, or can be a hydrocarbon fraction having a high concentration of mononuclear aromatics, e.g., 50 percent or higher, and containing other hydrocarbons, such as paraffins, that are normally present in petroleum distillate fractions boiling in the range of the particular mononuclear aromatics.

The olefins employed in our process are olefins of the $C_2$–$C_5$ range. The preferred olefin is propylene. The alkylation reaction can employ a single highly purified olefin or a mixture of two or more olefins or a fraction rich in one or more of the olefins and containing paraffins or other hydrocarbons of similar boiling range.

The catalyst employed in our process can provide important advantages over other catalysts over a considerable range of alkylation conditions but shows its greatest superiority in a certain range of conditions. Broadly, the conditions can include a temperature of 300° to 600° F., a pressure above 500 p.s.i.g., e.g., 500 to 1500 p.s.i.g. or higher, a mol ratio of aromatics to olefin in the range of 1:1 to 10:1, and a liquid-hourly space velocity of 1 to 6 volumes of hydrocarbon per volume of catalyst per hour. In our process space velocity is defined as the number of liquid volumes of aromatic plus olefin (the olefin being considered as dissolved in ideal solution) per volume of catalyst per hour (hereinafter abbreviated as vol./vol./hr.). The greatest advantages of the invention are obtained with the preferred reaction conditions which include: temperature of 450° to 550° F., pressure of 900 to 1100 p.s.i.g., space velocity of 1 to 3 vol./vol./hr., and mol ratio of aromatics to olefin of less than 3:1 and preferably of about 2:1. The preferred space velocity of 1 to 3 vol./vol./hr. is particularly preferred when dilute aromatic and olefin feeds are used.

The following examples describe the alkylation of toluene with propylene over different catalysts and demonstrate the unexpected advantages of our procedure of alkylation of aromatics in the presence of a fluorine-promoted, silica-alumina catalyst.

EXAMPLE I

The catalyst was granular, unpromoted silica-alumina of 10–20 mesh size. Specifically the catalyst was the socalled "Triple A" cracking catalyst consisting of 25 weight percent alumina and 75 weight percent silica. The feed consisted of a mixture of pure grade toluene and high purity (97–99%) propylene in a ratio of 2 mols of toluene per mol of propylene. The liquid feed was pumped upflow through the fixed bed catalyst at a liquid-hourly space velocity of 2 volumes of total hydrocarbons per volume of catalyst per hour. Reactor pressure was 1000 p.s.i.g. Runs were carried out at two different reaction temperatures, 300° F. and 450° F.

EXAMPLE II

In the runs of this example the catalyst was silica-alumina which had been treated to incorporate 3 weight percent fluorine in the catalyst. The silica-alumina was the same as employed in Example I and the pretreating procedure was as follows: 121.4 grams of silica-alumina was treated at room temperature with 117 milliliters of an aqueous HF solution containing 3.27 weight percent fluorine. The catalyst was then dried and calcined at 1000° F. for 10 hours. The finished catalyst contained 2.42 weight percent fluorine. The fixed-bed, fluorine-promoted catalyst was contacted with the toluene-propylene mixture in the same manner and under the same conditions as described in Example I.

EXAMPLE III

In the runs of this example the catalyst was silica-alumina which had been treated with boric acid to incorporate .5 weight percent $B_2O_3$ in the catalyst. The silica-alumina was the same as in Example I and the procedure was as follows: 17.7 grams of $H_3BO_3$ was dissolved in 171 milliliters of water at 160° F. The hot solution was added to 190 grams of silica-alumina. After thorough mixing the catalyst was dried at 250° F. for 20 hours and calcined at 1000° F. for 16 hours. The fixed-bed, $B_2O_3$-promoted silica-alumina catalyst was contacted with the same type of alkylation feed and under the same conditions as in the previous examples.

The results obtained with the different catalysts in the above examples are reported in the following table. The data reported for each temperature are the averages of data obtained in two runs at identical reaction conditions.

Table

[Reaction conditions: 2 LHSV; 2:1 toluene: Propylene mol ratio; 1000 p.s.i.g.]

| Example No. | I | | II | | III | |
|---|---|---|---|---|---|---|
| Catalyst | Unpromoted Silica-Alumina | | Silica-Alumina with 2.42% F | | Silica-Alumina with 5% $B_2O_3$ | |
| Run No. [a] | 1 | 2 | 3 | 4 | 5 | 6 |
| Temperature, °F | 300 | 450 | 300 | 450 | 300 | 450 |
| Toluene Conversion, Mol percent | 31.5 | 34 | 36.8 | 37.3 | 29.9 | 34.9 |
| Efficiency, Mol percent: | | | | | | |
| Benzene | 0.6 | 0.6 | 0.8 | 0.9 | 0.5 | 0.4 |
| o-Cymene | 24.8 | 19.9 | 12.9 | 6.3 | 27.9 | 20.9 |
| m-Cymene | 14.7 | 20.4 | 27.9 | 39.7 | 15.0 | 19.7 |
| p-Cymene | 30.4 | 34.3 | 26.6 | 32.6 | 30.4 | 33.7 |
| 3,5-DIPT [b] | 1.0 | 4.5 | 13.0 | 10.7 | 0.7 | 3.3 |
| Other DIPT [b] | 28.6 | 20.4 | 18.3 | 9.8 | 25.7 | 22.1 |
| Monoalkylate Distribution, Mol percent: | | | | | | |
| ortho | 35.5 | 26.7 | 19.0 | 7.9 | 38.0 | 28.2 |
| meta | 21.1 | 27.4 | 41.5 | 50.6 | 20.4 | 26.6 |
| para | 43.4 | 45.9 | 39.5 | 41.5 | 41.6 | 45.3 |

[a] In each indicated run the data are an average of two runs at same conditions.
[b] DIPT = diisopropyl toluene.

The above table shows that Example II employing the fluorine-promoted, silica-alumina catalyst was unexpectedly superior to the other examples in every important respect. Thus, in each run of Example II the conversion of toluene was greater than in any of the other runs. In this connection it should be noted that the conversion values of 36.8% and 37.3% in Example II correspond to values of 73.6% and 74.6% of theoretical, because the aromatic to olefin ratio was 2:1 and theoretically therefore only one-half of the toluene could react with the propylene.

A major difference between Example II and the other examples is in the production of meta- and para-cymenes in preference to the less valuable ortho-cymene. The table reports yields in terms of efficiency of production of the particular product. In this usage the efficiency is calculated as the mol percentage of toluene converted to the particular product divided by the mol percentage of toluene converted to all products. In run 4 of Example II the efficiency for production of meta- and para-cymene was 39.7% and 32.6%, respectively, or much higher than in the runs of the other examples. In run 4 the efficiency for ortho-cymene was only 6.3%, or much lower than the runs of the other examples. The monoalkylate distribution data show this result even more emphatically. They show that the ortho-isomer was only 7.9% of the monoalkylate product of run 4 whereas the lowest proportion of ortho- in any other example was 26.7% (run 2 of Example I).

Another valuable result of Example II is in the yield of 3,5-diisopropyl toluene relative to the isomers thereof. In runs 3 and 4 of Example II the efficiencies for production of 3,5-DIPT were 13.0% and 10.7%. These are considerably higher than corresponding values for the other runs. Although the principal aim of the process of the invention is production of monoalkylate, some polyalkylate is also produced, and it is an advantage of our process that the polyalkylate product has a high proportion of 3,5-diisopropyl toluene. This compound is valuable, for example, as a substitute for mesitylene in various chemical syntheses, such as oxidation to trimesic acid (1,3,5-benzene tricarboxylic acid).

The liquid reactor effluent such as described in Example II can be fractionated to produce two valuable products having different utility. Thus, a light fraction having an end point of about 400° F. or somewhat lower can be recovered which contains the monoalkylate and the unconverted toluene. This fraction is a valuable gasoline blending component because of its high concentration of the high octane rating meta- and para-cymenes. The heavier fraction, i.e., the fraction with initial boiling point above about 400° F., contains the polypropylated product. As indicated this product of our process is rich in 3,5-diisopropyl toluene which is a valuable chemical intermediate. The diisopropyl toluene products can thus be withdrawn as ultimate products of the process, or if desired can be passed either to a dealkylation stage, or recycled, to produce additional monoalkylate.

From the above considerations it can be seen that Example II, in accordance with the invention, was markedly superior to the other examples. The examples show that the addition of fluorine to the silica-alumina catalyst markedly improves its value for catalyzing the alkylation of toluene with propylene. The fluorine-promoted catalyst is superior for this purpose to the unpromoted silica-alumina catalyst, which however is an excellent alkylation catalyst. Furthermore, the promotion of the alkylation activity appears to be uniquely attributable to fluorine. The addition of another acidic promoter, namely, $B_2O_3$, to the silica-alumina did not produce the same improvement.

Obviously many modifications and variations of the invention as hereinbefore set forth may be made without departing from the spirit and scope thereof, and therefore only such limitations should be imposed as are indicated in the appended claims.

We claim:
1. The process which comprises contacting a mixture of toluene and propylene in the liquid phase with a silica-alumina catalyst containing 20 to 30 weight percent alumina, based on the silica-alumina content, and containing one to five weight percent fluorine, based on the total catalyst, under alkylation conditions including a temperature of 300° to 600° F., a pressure of at least 500 pounds per square inch gauge, a toluene to propylene mol ratio of 1:1 to 10:1 and a liquid hourly space velocity of one to six volumes of hydrocarbon per volume of catalyst per hour, and thereafter recovering a product predominating in the meta- and para-isomers of cymene.

2. The process which comprises contacting a mixture of toluene and propylene in the liquid phase with a silica-alumina catalyst containing 20 to 30 weight percent alumina, based on the silica-alumina content, and containing one to five weight percent fluorine, based on the total catalyst, under alkylation conditions including a temperature of 450° to 550° F., a pressure of about 500 to about 1500 pounds per square inch gauge, a toluene to propylene mol ratio of 1:1 to 3:1 and a liquid hourly space velocity of one to three volumes of hydrocarbon per volume of catalyst per hour, and thereafter recovering a product predominating in the meta- and para-isomers of cymene.

References Cited in the file of this patent
UNITED STATES PATENTS 2,584,103    Pines et al. _____ Feb. 5, 1952